United States Patent
Winter et al.

(10) Patent No.: US 9,771,971 B1
(45) Date of Patent: Sep. 26, 2017

(54) LOCKING BOOT FOR BALL JOINT

(71) Applicant: MEVOTECH LP, Toronto (CA)

(72) Inventors: Simon Winter, Toronto (CA); Jack McVeigh, Toronto (CA); Tyler Kearns, Toronto (CA); Rosan Luiz, Toronto (CA)

(73) Assignee: Mevotech LP, Ontario (CA)

( * ) Notice: Subject to any disclaimer, the term of this patent is extended or adjusted under 35 U.S.C. 154(b) by 0 days.

(21) Appl. No.: 15/338,933

(22) Filed: Oct. 31, 2016

(51) Int. Cl.
*F16C 11/06* (2006.01)
*B60G 7/00* (2006.01)

(52) U.S. Cl.
CPC .......... *F16C 11/0671* (2013.01); *B60G 7/005* (2013.01); *F16C 11/0614* (2013.01); *B60G 2204/416* (2013.01)

(58) Field of Classification Search
CPC ........ Y10T 403/315; Y10T 403/32729; F16C 11/0671; B60G 7/005
See application file for complete search history.

(56) References Cited

U.S. PATENT DOCUMENTS

| | | | |
|---|---|---|---|
| 2,786,359 A | 1/1955 | Karlan et al. | |
| 3,310,326 A | 3/1967 | Melone | |
| 3,322,445 A | 5/1967 | Hassan | |
| 3,901,518 A * | 8/1975 | Uchida | F16C 11/0671 277/635 |
| 4,121,844 A | 10/1978 | Nemoto et al. | |
| 4,322,175 A | 3/1982 | Szczesny | |
| 4,580,921 A * | 4/1986 | Broszat | F16C 11/06 277/635 |
| 4,921,368 A * | 5/1990 | Busse | F16C 11/0671 277/634 |
| 5,092,704 A * | 3/1992 | Buhl | B62D 7/16 277/635 |
| 5,466,084 A | 11/1995 | Brueggen et al. | |
| 5,538,275 A * | 7/1996 | Lomnick | B60G 7/005 277/635 |
| 5,743,669 A * | 4/1998 | Fujita | F16C 11/0633 29/898.051 |

(Continued)

*Primary Examiner* — Daniel Wiley
(74) *Attorney, Agent, or Firm* — Norton Rose Fulbright Canada LLP; Paul J. Field (57) ABSTRACT

An automotive component having an opening through which a ball joint extends, the ball joint comprising: a housing having an exterior substantially cylindrical surface, a seating surface radially extending from the exterior surface for abutting an adjacent first side of the automotive component, and a peripheral groove disposed in the exterior surface spaced axially from the seating surface a predetermined distance; a ball stud having a ball end mounted within the housing and a shank extending axially out of a crown of the housing; a flexible boot having an distal end sealingly engaged on the shank and an opposing proximal base end, the base end including a metal base ring with an inwardly extending flexible detent engaged in the peripheral groove in the housing and a base seal sealing engaged on the exterior surface, the base ring having a radially extending abutment surface for retaining an adjacent second side of the automotive component, and wherein the automotive component is selected from the group consisting of: a control arm; a stabilizer link; a stabilizer bar; and a steering linkage.

10 Claims, 6 Drawing Sheets

(56) References Cited

U.S. PATENT DOCUMENTS

| | | | |
|---|---|---|---|
| 5,752,780 A * | 5/1998 | Dorr | F16C 11/0633 403/122 |
| 6,439,795 B1 | 8/2002 | Lavery et al. | |
| 6,648,340 B2 * | 11/2003 | Yagyu | F16J 3/042 277/634 |
| 6,773,197 B2 * | 8/2004 | Urbach | B60G 7/005 403/135 |
| 7,670,078 B2 * | 3/2010 | Elterman | F16C 11/0671 277/635 |
| 7,931,279 B2 | 4/2011 | Niwa | |
| 7,980,564 B2 | 7/2011 | Niwa | |
| 9,476,447 B2 * | 10/2016 | Schmidt | F16C 11/0633 |
| 2006/0182491 A1 | 8/2006 | Bernhardt et al. | |

* cited by examiner

LOCKING BOOT FOR BALL JOINT

TECHNICAL FIELD

The invention relates to a locking boot for a flexible protective boot of a ball joint, used in an automotive suspension system, steering system or the like, having the dual purposes of retaining the boot securely sealed to the ball joint housing and also axially retaining the ball joint housing in an mating automotive component.

BACKGROUND OF THE ART

Ball joints allow pivoting movement of automotive suspension or steering components relative to each other while retaining the capacity to transmit axial and shear forces thereby accommodating wheel movement, steering movement, stability and wheel alignment. Ball joints include a stud with a shank that is typically threaded at one end for releasably connecting to an adjacent component. Other types of connections between the stud and component are also used. The stud has a spherical ball at the opposite end mounted within spherical bearings housed in a ball joint housing. Wear between the ball end and bearings is reduced by use of fluid lubricants.

A flexible rubber boot is resiliently sealed with a sliding seal to the outer surface of the stud shank and a base of the flexible boot is sealed and secured to the outer surface of the housing, to prevent contamination of the lubricant and contact surfaces by abrasive particles, moisture or chemicals like salt, and the accompanying abrasive wear, lubricant degradation and metal corrosion. The protective rubber boot holds the lubricant within the boot interior and the boot seals prevent contaminants from contacting the moving parts and lubricant within. Common means of mounting the base of a "press-in" flexible boot to the housing is to press, stretch and slide the boot base over the exterior of the rigid cylindrical housing. A press-in boot base is conventionally secured using a recessed groove in the housing, a spiral ring clip contracting the exterior of flexible boot around the exterior of the boot base, a resilient metal ring clip embedded in the rubber boot base, or a combination of these elements.

Such flexible boots can be easily removed since the retaining ring clips remain flexible and during heavy use the seal between the base of the boot and the housing can be damaged or unintentionally loosened thereby allowing penetration of contaminants into the lubricant and into contact with the bearings, ball end and other interior parts of the ball joint. Once contaminants such as abrasive particles, salt, moisture or chemicals are present within the interior of the ball joint, wear and corrosion are accelerated and the useful service life of the ball joint is reduced significantly.

Ball joints are mounted to adjacent automotive suspension, stabilization and steering components by mechanical press fitting or threading the cylindrical housing of the ball joint into a matching through hole in the component. For example ball joints are mounted to upper and lower control arms in wheel suspension systems, mounted at both ends of a stabilizer link, mounted to stabilizer bars and mounted in steering linkages.

A through hole is cast or forged, reamed, drilled or machined into the automotive component to match the exterior cylindrical surface of the ball joint housing. The housing often includes a laterally extending flange to abut the surface on the side of the component through which the ball joint is inserted. Once the housing is press fit or threaded and securely seated with the flange against the component surface, a resilient retention ring clip is mounted into a matching groove in the exterior of the housing.

The retention ring clip together with the flange secures the housing on opposite sides of the automotive component to limit relative axial movement. In the event that the press fit or threading connection fails, the retention ring clip provides a safety back-up system to prevent the ball joint and component from separating axially. Catastrophic failure and loss of vehicle control could occur if the ball joint housing becomes axially dislodged from the automotive component, particularly critical steering or suspension components.

The retention ring clip is often spaced an axial distance from the adjacent surface of the automotive component to allow access with tools and aid in installation. When dislodgement occurs, the axial distance between the retention ring clip and automotive component causes significant rattling noise, fretting and impact damage that further reduces the useful service life of the ball joint. A tight engagement between the retention ring clip and component surface would interfere with inserting the points of locking snap-ring pliers or other tools into matching holes in the ends of C-shaped retention ring clips during installation and manufacture.

Therefore some degree of gap is provided for tool access despite the possibility of rattling when the housing is dislodged, since the retention ring clip may be considered to be an emergency or seldom required back up safety measure to prevent catastrophic failure. Any rattling may be considered to be an audible warning that something is out of place or damaged in the suspension or steering system which requires investigation by a mechanic before a major failure occurs.

It is desirable to provide an improved connection between the ball joint housing and the automotive component, an improved connection between the ball joint housing and the flexible protective boot, and to simplify manufacture, installation and maintenance of auto motive ball joints.

Features that distinguish the present invention from the background art will be apparent from review of the disclosure, drawings and description of the invention presented below.

DISCLOSURE OF THE INVENTION

The invention provides a ball joint and an assembled automotive component having an opening through which a ball joint extends, the ball joint comprising: a housing having an exterior substantially cylindrical surface, a seating surface radially extending from the exterior surface for abutting an adjacent first side of the automotive component, and a peripheral groove disposed in the exterior surface spaced axially from the seating surface a predetermined distance; a ball stud having a ball end mounted within the housing and a shank extending axially out of a crown of the housing; a flexible boot having an distal end sealingly engaged on the shank and an opposing proximal base end, the base end including a metal base ring with an inwardly extending flexible detent engaged in the peripheral groove in the housing and a base seal sealing engaged on the exterior surface, the base ring having a radially extending abutment surface for retaining an adjacent second side of the automotive component, and wherein the automotive component is selected from the group consisting of: a control arm; a stabilizer link; a stabilizer bar; and a steering linkage.

Prior art ball joints as described above use two pieces of hardware to perform the tasks of (1) securing the base of the flexible protective boot to the ball joint housing and (2)

securing the press fit ball joint housing in the through hole of an automotive component as a safety measure in the event that the press fit fails and the housing is dislodged. In contrast, the present invention uses a single piece of hardware to perform both functions, namely the metal base ring with an inwardly flexible detent located at the base end of the flexible boot as described below.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
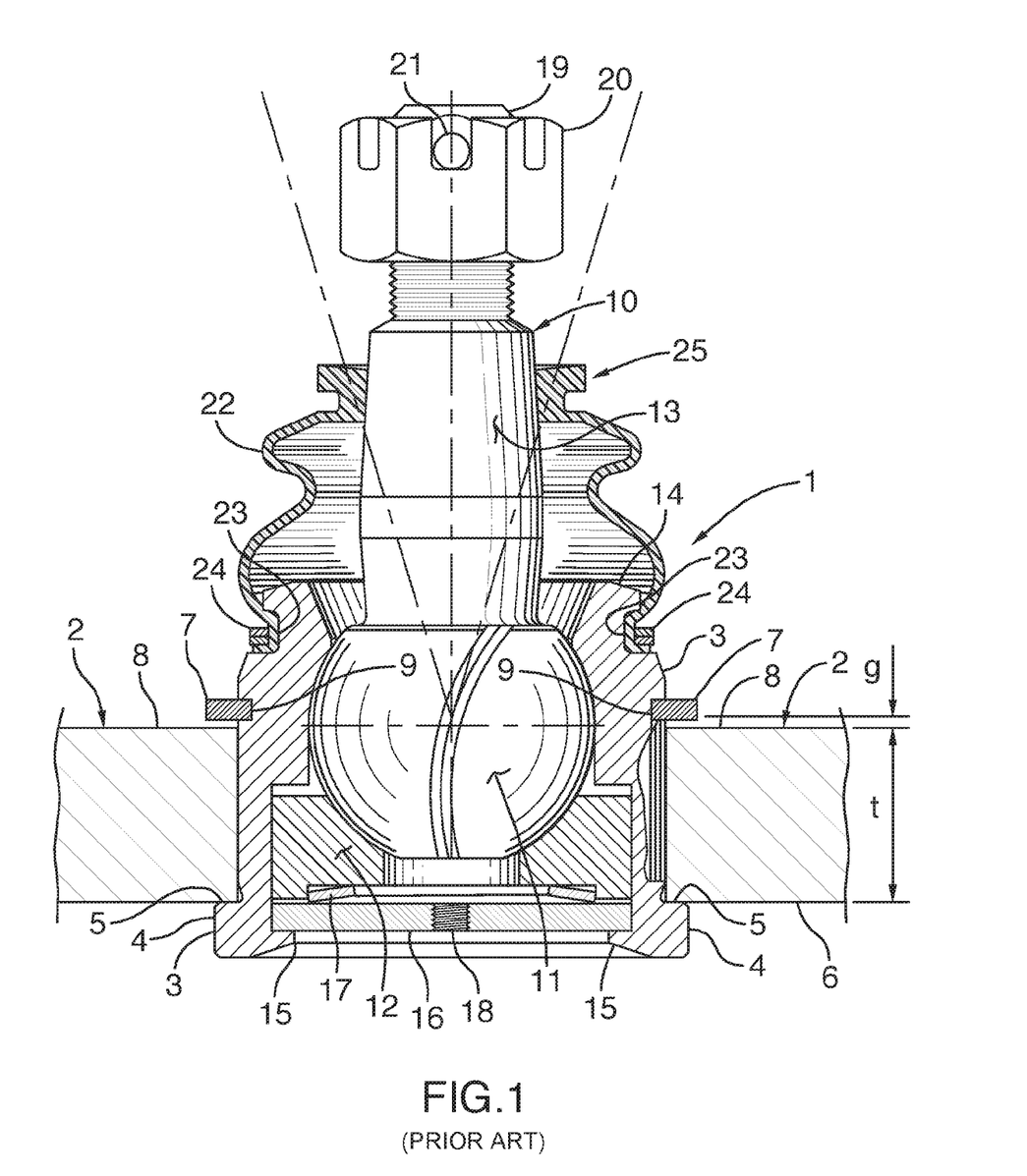
FIG. 1 is an axial sectional view through a prior art ball joint having a flexible boot secured in an upper groove in the ball joint housing using an outer spiral metal spring and having a retention spring clip in a lower groove that together with the lower flange abut both sides of the automotive component through which the ball joint housing extends.

FIG. 1 shows an axial sectional view through a prior art ball joint 1 mounted by press fitting into an opening through an automotive component 2. The automotive component could be any that use ball joint connections of various configurations such as: a control arm; a stabilizer link; a stabilizer bar; and a steering linkage. A laterally radially extending flange 4 limits the axial installation of the housing 3 into the opening during press fitting when a seating surface 5 abuts the adjacent first side 6 of the automotive component 2.

To retain the housing 3 in the component 2 if the press fit connection fails, a removable retention spring clip 7 is provided adjacent the opposite second side 8 of the automotive component 2. The retention spring clip 7 can be a standard C-shaped snap ring clip or retaining ring removable with needle nosed pliers that are conventionally used. The retention spring clip 7 is radially biased inward and snaps into a peripheral retention groove 9 disposed in the exterior surface of the housing 3. The retention groove 9 is spaced axially from the seating surface 5 a predetermined distance that equals the thickness "t" of the automotive component 2 plus a gap "g". The gap "g" is generally provided to accommodate manufacturing tolerances and to provide clearance for the points of the snap ring pliers used in installation or removal that project into holes (not shown) in the ends of the C-shaped retention spring clip 7.

The housing 3 encloses a ball stud 10 having a ball end 11 mounted within a lower spherical bearing 12. In the example shown the upper portion of the ball end 11 bears against a spherical surface of the interior of the housing 3, however alternatively an upper bearing may be provided. The ball end 11 and bearing 12 are lubricated and held in the housing 3 by a roll formed edge 15 that is mechanically formed after the closure plate 16 and spring washer 17 are installed in the housing 3. Port 18 is fitted with a grease nipple (not shown) and lubricant is injected into the interior of the housing 3.

The ball stud 10 has a shank 13 extending axially out of a crown 14 of the housing 3. A threaded end 19 of the ball stud 10 has a castle nut 20 and spring pin 21 to connect the ball stud 10 and automotive component 2 to other parts of the automotive suspension or steering system (not shown).

In the prior art example of FIG. 1, a flexible boot 22 is secured in an upper groove 23 in the ball joint housing 3 using an outer spiral metal spring 24. The flexible boot 22 is installed by sliding the lower boot end over the crown 14 of the housing 3. The spiral metal spring 24 or other retention ring is radially stretched and placed on the exterior of the boot end outside the upper groove 23 to resiliently secure the boot end in the upper groove 23. A distal end 25 of the flexible boot 22 is sealingly engaged with seal lips (not shown) to slide on the ball stud shank 13 as the ball stud 10 pivots. The sealing of the flexible boot 22 with the spiral metal spring 24 in the groove 23, and with a sliding seal at the distal end 25, contains the lubricant within the interior of the housing 3 and within the interior of the flexible boot 22 and impedes contamination by abrasive particles, moisture and chemicals.

FIGS. 2-8 illustrate an example embodiment of the invention relating to the housing, boot and automotive component shown without the ball stud, and bearing for simplicity. The embodiment uses a single peripheral groove 26 in the exterior of the ball joint housing 27 and a single metal base ring 28 embedded in the base end 29 of the flexible boot 30 to perform the dual tasks of (1) securing the flexible protective boot 30 to the ball joint housing 27 and (2) securing the press fit ball joint housing 27 in the through hole of an automotive component (31-FIG. 3) as a safety measure in the event that the press fit fails and the housing 27 is dislodged.

Figure 2:
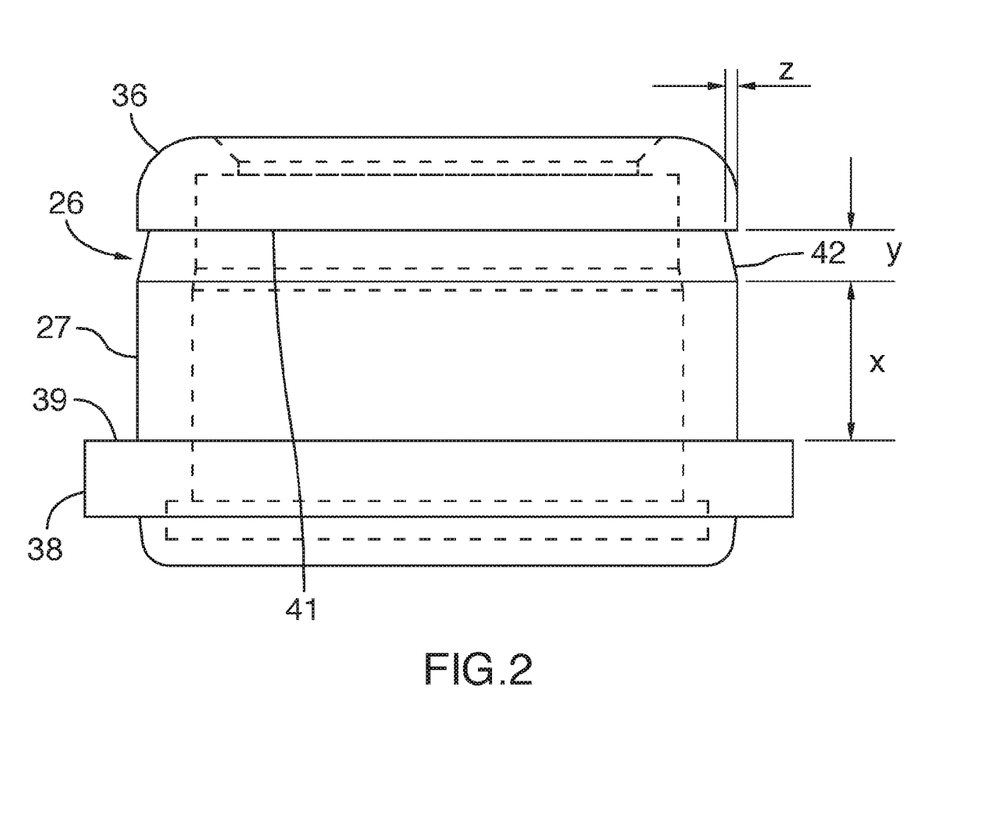
FIG. 2 is a side view of a ball joint housing in accordance with an embodiment of the invention that is adapted to receive an upper and a lower bearing, having a lower flange and a single upper groove.
Figure 3:
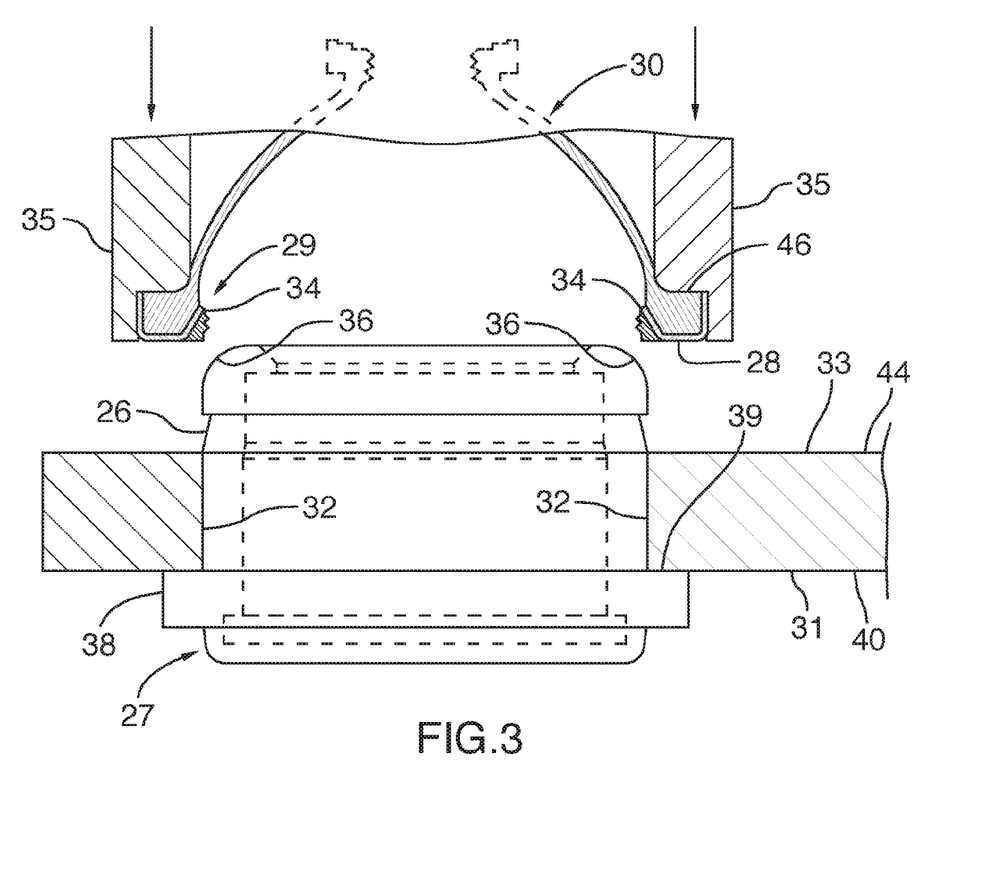
FIG. 3 is a side view of the ball joint in FIG. 2 shown installed in a through opening extending through an automotive component where the groove is disposed above the adjacent surface of the automotive component to receive the detents of the metal base ring slidingly installed using an annular installation tool.
Figure 8:
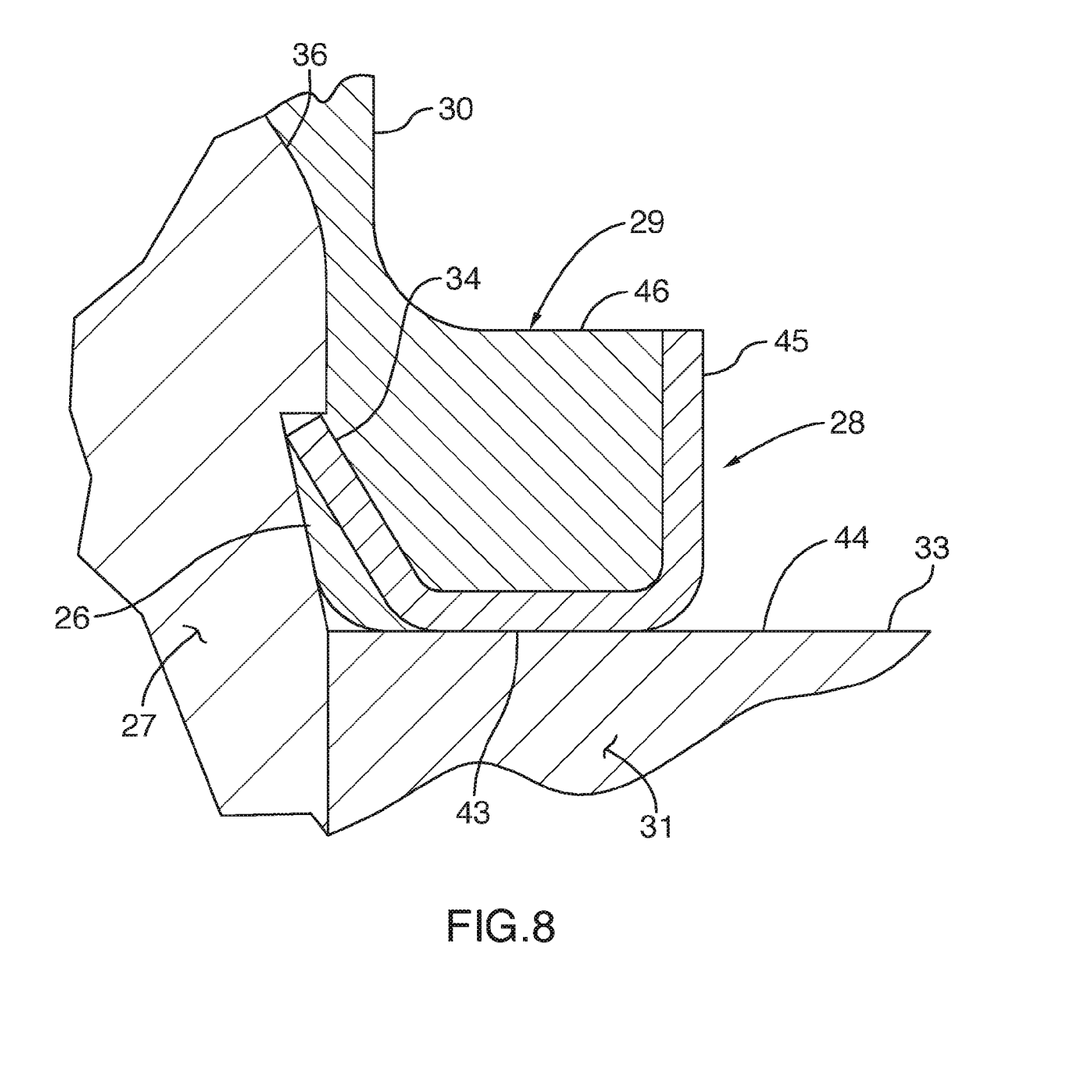
FIG. 8 is an axial sectional detail through the base ring and boot base as in FIG. 7 with the flexible metal tabs of the base ring resiliently engaged in the groove of the housing and seal lips compressed against the housing.

FIG. 2 is a side view of the ball joint housing 27 which in FIG. 3 is installed in a through opening 32 extending through the automotive component 31. The peripheral groove 26 is disposed above the adjacent surface 33 of the automotive component 31 to receive the flexible detents 34 (see FIG. 6) of the metal base ring 28. As shown in FIG. 3, using an annular installation tool 35 and pressing in the direction of the arrows, the base end 29 of the flexible boot 30 is installed over the crown 36 of the housing 27. The detents 34 resiliently bend and when pushed down further will snap lock into the peripheral groove 26 as indicated in FIG. 8.

Figure 4:
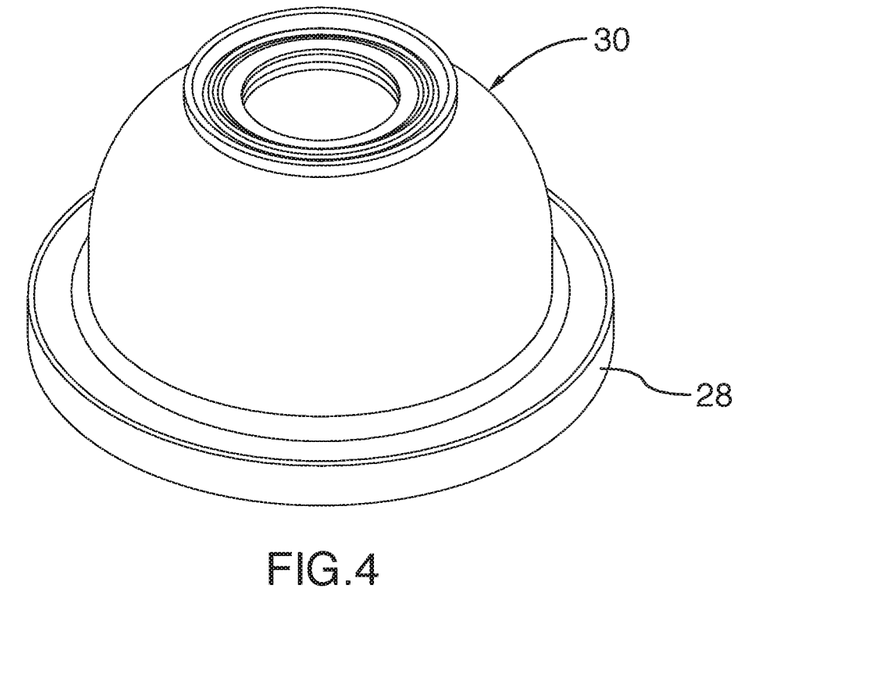
FIG. 4 is a top side isometric view of a flexible boot having a metal base ring embedded in the rubber of the boot.
Figure 5:
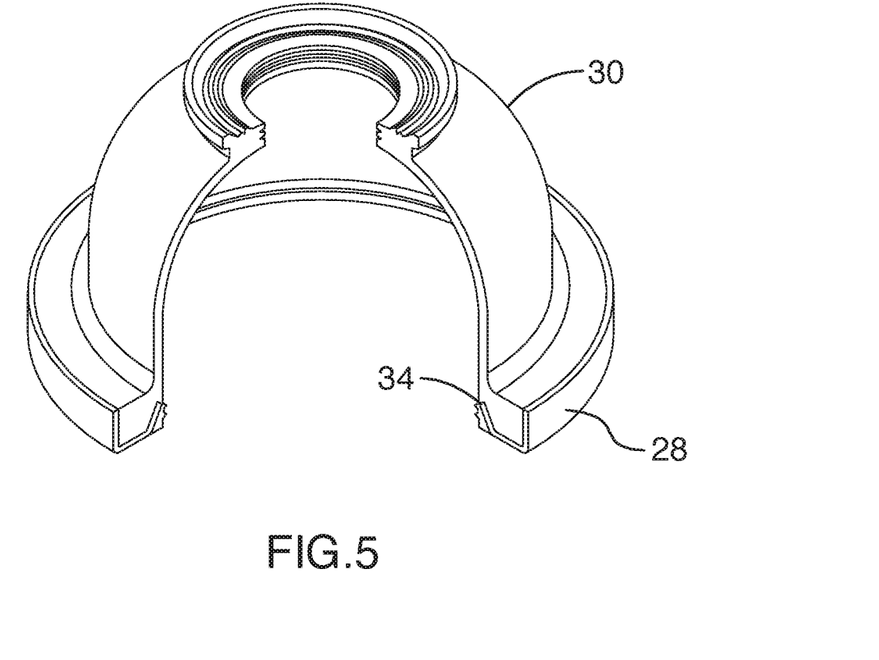
FIG. 5 is a cutaway top side isometric view like FIG. 4 with an axial section through the flexible boot and base ring showing the generally L shaped cross-section with inward directed flexible metal tabs and resilient rubber sealing lips.
Figure 6:
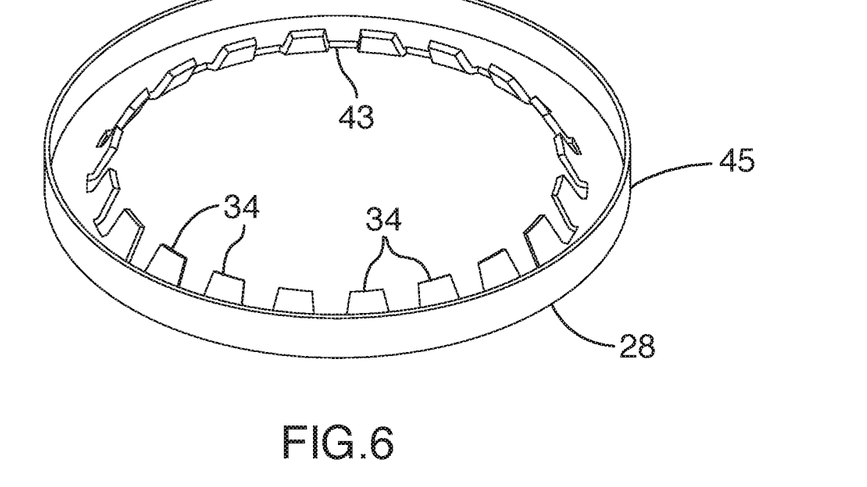
FIG. 6 is a top side isometric view of the base ring alone showing inward directed flexible metal detent tabs.
Figure 7:
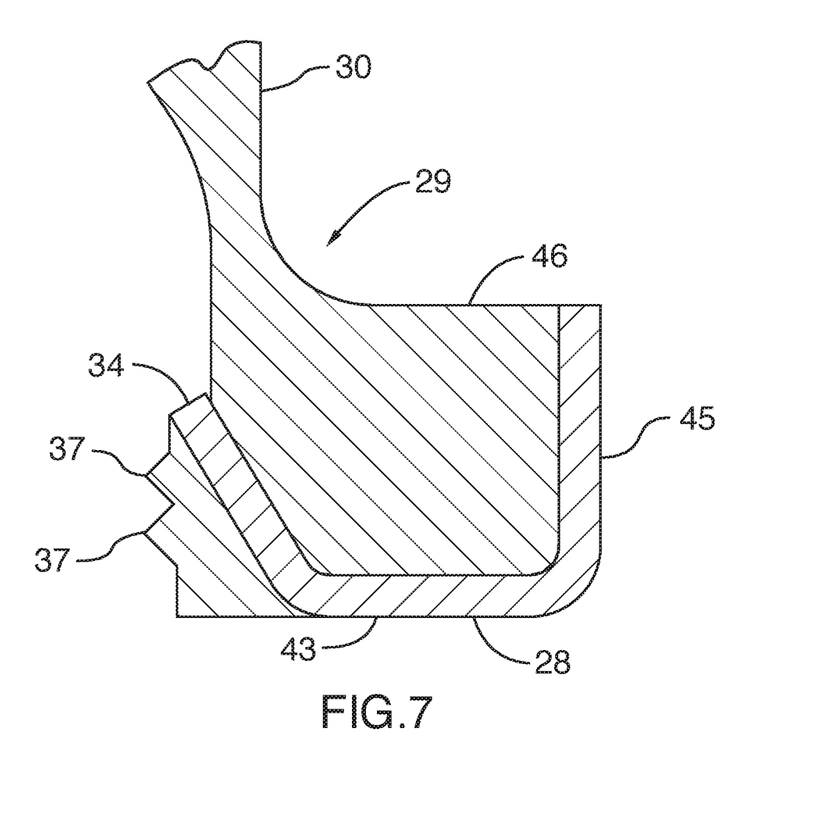
FIG. 7 is an axial sectional detail through the base ring and boot base as in FIG. 5 showing the generally L shaped cross-section of the metal base ring with inward directed flexible metal detent tabs and flexible seal lips of the rubber boot within which the metal base ring is embedded.

FIGS. 4 and 5 show the flexible boot 30 with the metal base ring 28 embedded in the rubber of the boot 30 with inwardly directed detents 34. FIG. 6 shows the base ring 28 alone showing the inward directed flexible metal detents 34 as sheet metal tabs. FIG. 7 is an axial sectional detail through the base ring 28 and boot base end 29 showing the generally L shaped cross-section of the base ring 28 with inward directed flexible metal detents 34 or tabs and flexible seal lips 37 of the rubber boot 30 within which the base ring 28 is embedded. FIG. 8 shows the installed position of the base ring 28 and boot base 29 with the flexible metal detents 34 or tabs of the base ring 28 resiliently engaged in the peripheral groove 26 of the housing 27. The resilient rubber seal lips 37 are fully compressed against the housing 27 and the adjacent surface 33 of the automotive component 31.

Referring to FIGS. 2-3, the invention provides a ball joint housing 27 for mounting into an opening 32 through an automotive component 33. A flexible protective boot 30 seals against the shank (not shown) of a ball stud (not shown) with a ball end (not shown) mounted within the housing 27. The shank extends axially upward out of a crown 36 of the housing 27.

The housing 27 has an exterior substantially cylindrical surface that is press fit into the opening 32 from bottom to top as drawn. When fully press fit in place, a flange 38 radially extending from the exterior surface of the housing 27 has a seating surface 39 abutting an adjacent first side 40 of the automotive component 31. The peripheral groove 26 in the exterior surface of the housing 27 is spaced axially from the seating surface 39 a predetermined distance "x" as shown in FIG. 2. Distance "x" is at least the thickness of the automotive component 31, and may include a tolerance for manufacturing and to allow the detents 34 to engage the groove 26. The peripheral groove 26 has a radially extending detent surface 41 recessed radially inwardly by a dimension "z". As shown in the example, the peripheral groove 26 has a tapered surface 42 extending from the radially inward edge of the detent surface 41 to the exterior cylindrical surface of the housing 27 a distance of "y". Other shapes of grooves 26 can be used. A tapered surface 42 provides the required detent surface 41 and a surface against which to seal the lips 37 (FIG. 8) without unnecessarily removing material from the wall of the housing 27.

Referring to FIG. 3-8, the base end 29 includes a metal base ring 28 with inwardly extending flexible detents 34 engaged in the peripheral groove 26 when installed. As best seen in FIGS. 7-8 The base end 29 of the rubber flexible boot 30 has flexible rubber lips 37 that form a base seal sealing engaged on the exterior surface of the housing 27. The base ring 28 is generally L-shaped having a radially extending abutment surface 43 for retaining an adjacent second side 44 of the automotive component 31.

The base ring 28 best seen in FIGS. 6-8 also can have an annular exterior wall 45 extending from an outer periphery of the abutment surface 43. The base ring 28 can be vulcanized with the rubber boot 30 when the boot 30 is molded. The base ring 28 illustrated is stamped from sheet metal and the detent 34 comprises multiple radially extending resilient tabs. The detent tabs 34 extend from an inner periphery of the abutment surface 43 in an inclined axial and radial inward direction toward the crown 36 of the housing 27. The crown 36 of the housing 27 in the example is shown with a rounded edge but a tapered edge would serve equally to guide the detents 34. The crown outer diameter is less than the at rest inner detent diameter so that the detents 34 are gradually flexed on contact with the crown 36 and then resiliently engage the detent surface 41 of the groove 26 when the abutment surface 43 of the base ring 28 is fully engaged with the second side 44 of the automotive component 31.

The base end 29 of the flexible boot 30 includes a laterally extending installation flange 46 of flexible material joined to the metal base ring 28 opposite the abutment surface 43. As indicated in FIG. 3 an annular tubular installation tool 35 may be used to hold the base end 29 and metal base ring 28. The annular contact end of the tool 35 is shaped to engage with the laterally extending installation flange 46 of the boot 30. The metal base ring 28 may also include an annular exterior wall 45 that engages in the tool 35 and transfers impact loads to the base ring 28 from the tool 35. The tool 35 can be simply struck with a rubber mallet on an impact end (not shown) opposite the annular contact end engaging the metal base ring 28 to force the boot 30 in the direction of arrows shown in FIG. 3.

The present invention uses a single metal base ring 28 to perform two functions, namely to retain the flexible boot 30 on the housing 27 and provide a secondary retention to retain the housing 27 in the automotive component 31 in the event that the primary retention means fails, namely the press fit between the ball joint housing and the automotive component. The size of the housing 27 can be reduced axially compared to the prior art since a single retention groove 26 in the exterior surface of the housing 27 is required to engage a single base ring 28 and detents 34. Installation is simplified since only one part is handled and used. A more durable, protected, superior seal against contaminants is provided for the base end 29 of the flexible boot 27 which fits tightly against the adjacent surface 44 of the automotive component 31 and against the tapered surface 42 of the housing 27. The housing 27 is secured tightly to the automotive component 31 without a gap between the retention device (metal base ring 28) and the automotive component 31.

Although the above description relates to a specific preferred embodiment as presently contemplated by the inventors, it will be understood that the invention in its broad aspect includes mechanical and functional equivalents of the elements described herein.

We claim:

1. A ball joint, for mounting into an opening through an automotive component, the ball joint comprising:
   a housing having an exterior substantially cylindrical surface, a seating surface radially extending from the exterior surface for abutting an adjacent first side of the automotive component, and a peripheral groove disposed in the exterior surface spaced axially from the seating surface a predetermined distance;
   a ball stud having a ball end mounted within the housing and a shank extending axially out of a crown of the housing;
   a flexible boot having a distal end sealingly engaged on the shank and an opposing proximal base end, the base end including a metal base ring with an inwardly extending flexible detent engaged in the peripheral groove in the housing and a base seal sealing engaged on the exterior surface, the base ring having a radially extending abutment surface for retaining an adjacent second side of the automotive component against axial movement relative to the housing.

2. The ball joint according to claim 1, wherein the base ring has an annular exterior wall extending from an outer periphery of the abutment surface.

3. The ball joint according to claim 2, wherein the base ring is formed of sheet metal and the detent comprises radially extending resilient tabs.

4. The ball joint according to claim 3, wherein the tabs extend from an inner periphery of the abutment surface in an axial direction toward the crown of the housing.

5. The ball joint according to claim 1 wherein the peripheral groove in the housing has a radially extending detent surface.

6. The ball joint according to claim 5 wherein the peripheral groove in the housing has a tapered surface extending from a radially inward edge of the detent surface to the exterior substantially cylindrical surface of the housing.

7. The ball joint according to claim 1 wherein the crown of the housing has a distal crown diameter less than an at rest inner detent diameter.

8. The ball joint according to claim 1 wherein the base end of the flexible boot includes a laterally extending installation flange of flexible material joined to the metal base ring opposite the abutment surface.

9. The ball joint according to claim 8 comprising a tubular installation tool having an annular contact end engageable with the laterally extending installation flange of the flexible boot and an impact end opposite the annular contact end.

10. An automotive component having an opening through which a ball joint extends, the ball joint comprising:
- a housing having an exterior substantially cylindrical surface, a seating surface radially extending from the exterior surface for abutting an adjacent first side of the automotive component, and a peripheral groove disposed in the exterior surface spaced axially from the seating surface a predetermined distance;
- a ball stud having a ball end mounted within the housing and a shank extending axially out of a crown of the housing;
- a flexible boot having a distal end sealingly engaged on the shank and an opposing proximal base end, the base end including a metal base ring with an inwardly extending flexible detent engaged in the peripheral groove in the housing and a base seal sealing engaged on the exterior surface, the base ring having a radially extending abutment surface for retaining an adjacent second side of the automotive component against axial movement relative to the housing, and
- wherein the automotive component is selected from the group consisting of: a control arm; a stabilizer link; a stabilizer bar; and a steering linkage.

\* \* \* \* \*